United States Patent [19]
Dickinson

[11] Patent Number: 5,500,929
[45] Date of Patent: Mar. 19, 1996

[54] SYSTEM FOR BROWSING A NETWORK RESOURCE BOOK WITH TABS ATTACHED TO PAGES

[75] Inventor: Robert D. Dickinson, Hayward, Calif.

[73] Assignee: Taligent, Inc., Cupertino, Calif.

[21] Appl. No.: 113,623

[22] Filed: Aug. 30, 1993

[51] Int. Cl.$^6$ ........................................ G06F 3/00
[52] U.S. Cl. ........................ 395/160; 395/159; 395/157
[58] Field of Search .................... 395/155–161, 395/650–700, 200, 162, 164, 200.01–200.16, 200.19–200.21, 152–153, 182.18, 182.03, 479; 364/578; 382/151; 345/156

[56] References Cited

U.S. PATENT DOCUMENTS

| | | | |
|---|---|---|---|
| 4,649,499 | 3/1987 | Sutton et al. | 395/161 |
| 4,821,220 | 4/1989 | Duisberg | 364/578 |
| 4,885,717 | 12/1989 | Beck et al. | 395/775 |
| 4,891,630 | 1/1990 | Friedman et al. | 345/156 |
| 4,953,080 | 8/1990 | Dysart et al. | 364/600 |
| 5,041,992 | 8/1991 | Cunningham et al. | 395/159 X |
| 5,050,090 | 9/1991 | Golub et al. | 364/478 |
| 5,057,996 | 10/1991 | Cutler et al. | 395/200 |
| 5,060,276 | 10/1991 | Morris et al. | 382/151 |
| 5,075,848 | 12/1991 | Lai et al. | 395/479 |
| 5,093,914 | 3/1992 | Coplien et al. | 395/700 |
| 5,119,475 | 6/1992 | Smith et al. | 395/156 |
| 5,125,091 | 6/1992 | Staas, Jr. et al. | 395/650 |
| 5,133,075 | 7/1992 | Risch | 395/600 X |
| 5,136,705 | 8/1992 | Stubbs et al. | 395/183.03 |
| 5,136,712 | 8/1992 | Perazzoli, Jr. et al. | 395/700 |
| 5,140,678 | 8/1992 | Torres | 395/159 |

(List continued on next page.)

FOREIGN PATENT DOCUMENTS 9102305  2/1991  WIPO.

OTHER PUBLICATIONS

Stallings, "Data and Computer Communications", MacMillan Pub. Co., 1988, pp. 385–388.
Sinha et al., "An Introduction to Network Programming Using the Net BIOS Interface", Apr. 1992, p. 61 (21).
Hirakawa et al., "A Framework for Construction of Icon Systems", IEEE 1988, pp. 70–77.
Microsoft Windows, Microsoft Corp., 1992, Screen pp. 1–9.
Data Communications. V.22(10), Jul. 1993, New York, US, pp. 105–108 P. Coppola "Apple's OCE Takes the Labor Out of Collaborations".
IBM Technical Disclosure Bulletin. V.35(6), Nov. 1992, New York, US, pp. 263–264, "Resources View for User Accounts".
IBM Technical Disclosure Bulletin, V.33(9), Feb. 1991, New York, US, pp. 1–4 "Address Book Class Hierarchy".
IBM Technical Disclosure Bulletin. V.34(4A), Sep. 1991, New York, US, pp. 243–244, "System for Integrating Lap Top Computers Into Users' Environments".
IBM Technical Disclosure Bulletin. V.33(11), Apr. 1991, New York, US, pp. 287–288 "Enhanced Directory Entries".
IBM Technical Disclosure Bulletin, V.34(5), Oct. 1991, New York US, pp. 309–310 "Office Container Class".
The 2nd International Conference on Computers and Applications, Jun. 23, 1987, Beijing, China, pp. 23–29, K. Sugawara et al. "A Consideration on an End User Interface of Computer Network Systems".

*Primary Examiner*—Raymond J. Bayerl
*Assistant Examiner*—John E. Breene

[57] ABSTRACT

Browsing through a diverse set of resources residing on a network using a name service protocol is accomplished with an object oriented operating system. A window is displayed with several resource books. A resource book is selected by the user and the computer resources associated with the selected book are displayed in another window. Attached to the page of the book, tabs indicate the type of resources and are used to navigate through the book. Upon selection of a specific resource, the user may direct the resource to implement a task within a directed fashion. Furthermore, the system allows the user to form personal directories to facilitate the selection of frequently utilized resources.

19 Claims, 10 Drawing Sheets

U.S. PATENT DOCUMENTS

| | | | |
|---|---|---|---|
| 5,151,987 | 9/1992 | Abraham et al. | 395/182.18 |
| 5,163,131 | 10/1992 | Row et al. | 395/200.01 |
| 5,181,162 | 1/1993 | Smith et al. | 395/600 X |
| 5,206,951 | 4/1993 | Khoyi et al. | 395/650 |
| 5,226,117 | 7/1993 | Miklos | 395/157 |
| 5,233,687 | 8/1993 | Henderson, Jr. et al. | 395/158 |
| 5,237,651 | 8/1993 | Randall | 395/155 X |
| 5,283,864 | 2/1994 | Knowlton | 395/158 |
| 5,305,435 | 4/1994 | Bronson | 395/159 |
| 5,315,703 | 5/1994 | Matheny et al. | 395/164 |
| 5,341,293 | 8/1994 | Vertelney et al. | 395/159 |
| 5,367,624 | 11/1994 | Cooper | 395/157 |
| 5,377,323 | 12/1994 | Vasudevan | 395/200.16 |
| 5,379,432 | 1/1995 | Orton et al. | 395/700 |
| 5,392,387 | 2/1995 | Fitzpatrick et al. | 395/156 |
| 5,394,523 | 2/1995 | Harris | 395/162 |
| 5,416,895 | 5/1995 | Anderson et al. | 395/161 X |
| 5,428,729 | 6/1995 | Chang et al. | 395/153 |
| 5,434,974 | 7/1995 | Loucks et al. | 395/200.16 X |
| 5,438,662 | 8/1995 | Randall | 395/161 |
| 5,442,795 | 8/1995 | Levine et al. | 395/159 X |

SYSTEM FOR BROWSING A NETWORK RESOURCE BOOK WITH TABS ATTACHED TO PAGES

CROSS-REFERENCE TO RELATED PATENT APPLICATIONS

This application is related to the following U.S. patent applications:

(a) the application entitled "Object Oriented Framework System," by Debra L. Orton, David B. Goldsmith, Chistopher P. Moeller, and Andrew G. Heninger, filed Dec. 23, 1992, and assigned to Tallgent, Inc., the disclosure of which is hereby incorporated by reference;

(b) the application entitled "Business Card System," by Robert D. Dickinson, filed Jan. 22, 1993, and assigned to Taligent, Inc., the disclosure of which is hereby incorporated by reference; and (c) the application entitled, "Place Object Display System", by Robert D. Dickinson, filed Jun. 3, 1993, and assigned to Taligent, Inc., the disclosure of which is hereby incorporated by reference.

1. Field of the Invention

This invention generally relates to a method for accessing various resources of a computer through an object oriented operating system, and more particularly, to the access and selection of various resources of a network for implementing desired tasks.

2. Background of the Invention

A name service directory or hierarchy is a collection of objects within a networked computer system. Presently, no universal name service directory exists among networked computers. That is, no common framework for names and representations of objects exist within current networks of computers. As a consequence, networks are filled with a multitude of name service directories for differing objects, and a plethora of user interfaces.

Name service directories are typically organized hierarchically and contain collections of resources. Each collection refers to a distinct portion of a name service. Resources are sources of information that supply or support user interactions. For instance, resources can include people, places, and things such as printers, workstations, facsimile machines, as well as other services that are available to a user.

Current computer systems disperse information concerning resources over multiple name service directories and present them to a user in various inconsistent interfaces. Accordingly, a user is required to independently search through multiple name service directories before locating a desired resource. Such searches usually demand a user to expend large amounts of time in allocating a resource. A typical computer user is, however, usually unable to invest a substantial period of time in searching a resources before an appropriate name service directory and resource can be selected.

In addition to the lengthy and complex procedures for accessing a resource, current computer systems also do not provide for the implementation of a desired task through a resource. Thus, a user is required to first locate a resource and then implement the resource through a separate application. In sum, the prior art that the applicant is aware of provides a computer system that is overly complex and tedious for accessing typical resources that are located on a network. Moreover, the prior art that the applicant is aware of provides no manner by which a desired task can be implemented through an accessed resource within the same application.

SUMMARY OF THE INVENTION

The invention overcomes the aforementioned deficiencies of the prior art by providing a method and apparatus for accessing and invoking resources from a window.

A system and method are used for selecting a particular resource from a plurality of networked computer resources in an object oriented operating system resident in a storage under the control of a processor with an attached display. A window is displayed containing one or more phonebooks. A phonebook is selected and computer resources associated with the particular phonebook are displayed along with tabs representative of types of computer resources.

BRIEF DESCRIPTION OF THE DRAWINGS

The foregoing and other objects, aspects and advantages of a preferred embodiment will be better understood from the following detailed description of the preferred embodiment of the invention with reference to the accompanying drawings, in which.

DETAILED DESCRIPTION OF A PREFERRED EMBODIMENT OF THE INVENTION

Computer System

Figure 1:
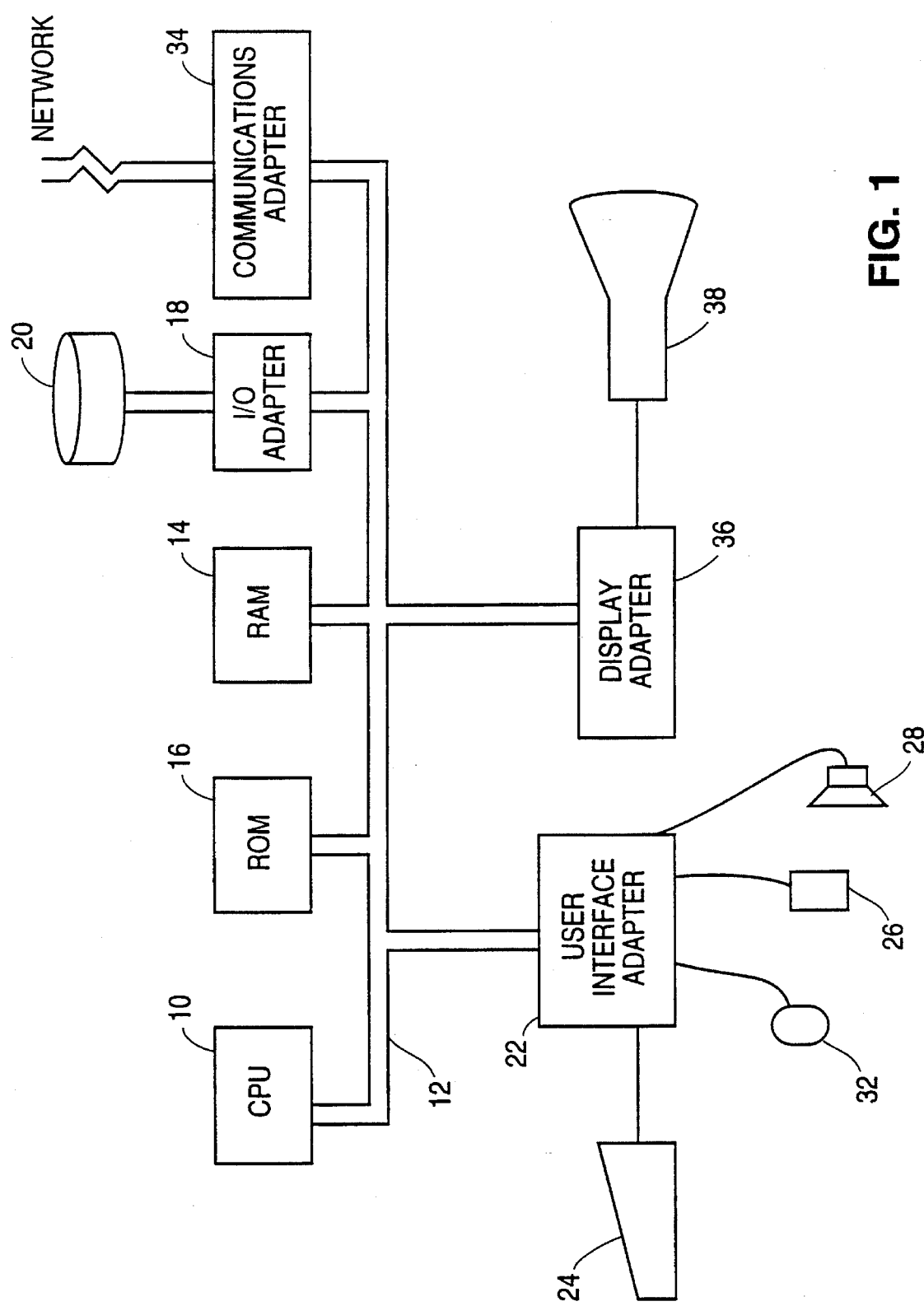
FIG. 1 is a block diagram of a computer system in accordance with a preferred embodiment.

A representative hardware environment is depicted in FIG. 1, which illustrates a suitable hardware configuration of a workstation 40 to be employed in accordance with a preferred embodiment. The workstation 40 has a central processing unit 10, such as a conventional microprocessor, and a number of other units interconnected via a system bus 12. The illustrated workstation 40 shown in FIG. 1 includes a Random Access Memory 14 (RAM), a Read Only Memory 16 (ROM), an I/O adapter 18 for connecting peripheral devices such as disk units to the bus 12, a user interface adapter 22 for connecting a keyboard 24, a mouse 26, a speaker 28, a microphone 32, and/or other user interface devices such as a touch screen device (not shown) to the bus 12. The workstation 40 may also have a communications adapter 34 for connecting the workstation 40 to a data processing network 30 and a display adapter 36 connecting the bus 12 to a display device 38.

The resource book is based on an object oriented object architecture. Preferably, the architecture described within the U.S. patent application entitled "Object Oriented Framework System" filed Dec. 23, 1992, is employed within the preferred embodiment. The resources represented within the resource book are thus considered workspace objects. This allows for each resource to: (i) be directly moved within the resource book by a drag and drop technique; (ii) be used as operands in drag & drop operations to other workspace objects; and (iii) be dragged from the resource book and placed upon a user desktop for future use.

Typically, a multitude of addresses and resources associated with the addresses are available to a user through a computer network. Such name services contain diverse resources which each reside within a particular namespace of a name service directory. Resources are the fundamental objects within a name service directory and include objects which refer to persons, places and things, such as services and printers. All of such objects are typically accessible through a network and each provide a unique function to a user.

Name service protocols are employed to access and query a name service directory for information contained within the name service directory. Multiple different name service protocols are supported by a preferred embodiment. In particular, the following protocols are supported by a preferred embodiment: the Name Binding Protocol (NBP) of AppleTalk, the Internet Domain Name Service (DNS), the X.500 of CCITT, and the Distributed Name Service (DNS) of DCE. Furthermore, a preferred embodiment supports multi-level nested hierarchies of namespaces. Such support is necessary since each name service has differing needs with respect to browsing mechanisms. Thus, the inherent hierarchical nature of each name service must be taken into account.

A resource book can be compared with typical telephone directories since it presents information in a similar manner. Within a typical telephone directory resides a vast assortment of businesses and agencies which can perform some needed function. Ordinarily, persons consult telephone directories to find information regarding people and services. Telephone directories are thus typically employed as a starting point in order to reveal further information. For instance, a person would consult a telephone directory to ascertain the location of a library or telephone number for a person and thereafter retrieve information from the library or person. A preferred embodiment serves to fulfill the same function as a telephone directory. Unlike a telephone directory, however, a preferred embodiment implements tasks through the resources contained within it.

The resource book permits a user to examine the available resources and select specific resources to implement a desired task. Furthermore, the resource book also provides a user with the ability to conveniently place selected resources within the workstation of the user for subsequent retrieval and usage.

A preferred embodiment provides a user with three primary functions. First, a preferred embodiment permits a user to browse through all available resources. Second, a user selects one or more desired resources. Third, a preferred embodiment employs the selected resource to implement a task at the direction of the user.

Figure 2:
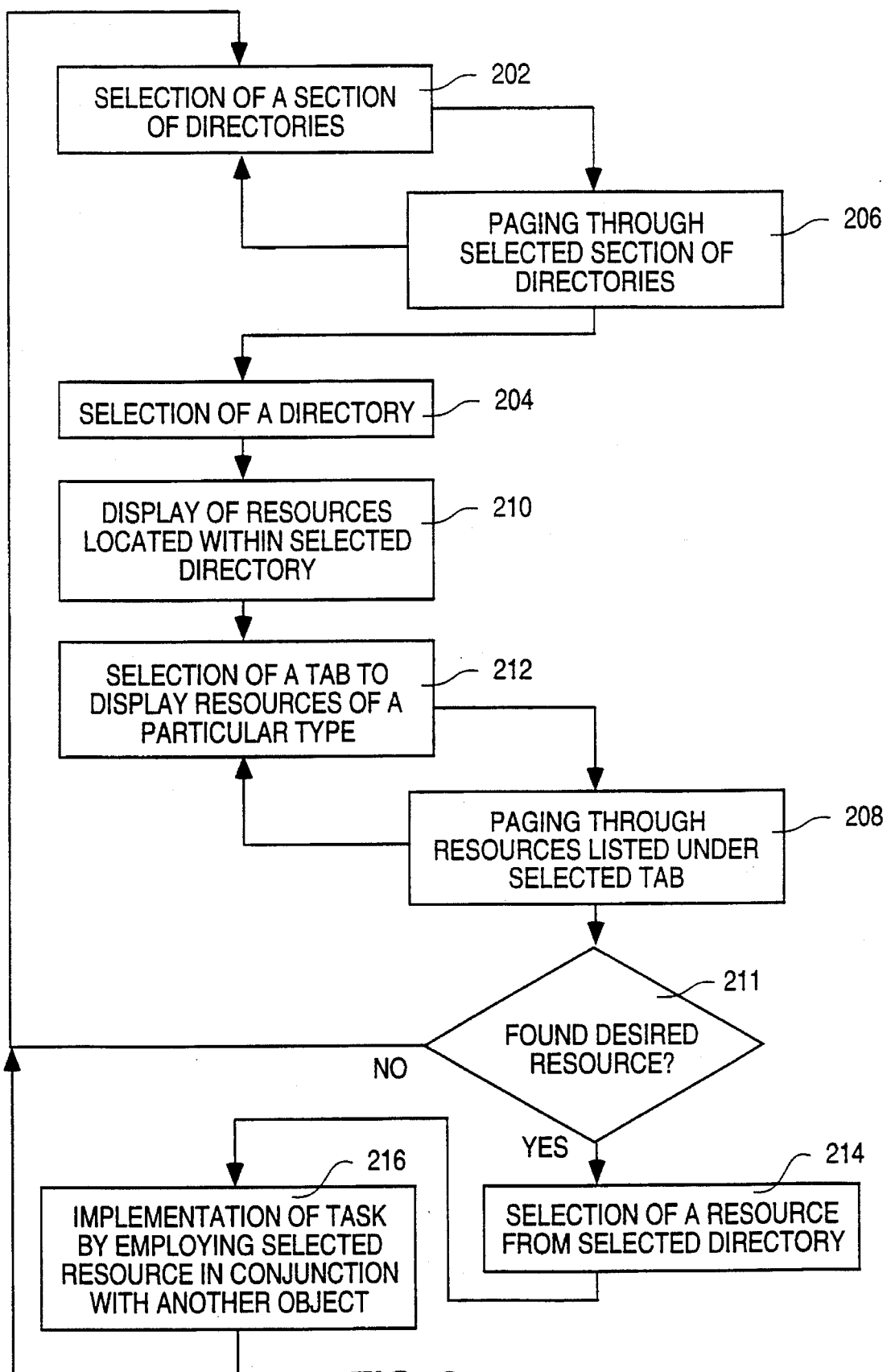
FIG. 2 is a flow chart depicting the general operation of a preferred embodiment.

Referring to FIG. 2, a flow chart depicting the general operation of a preferred embodiment is illustrated. Initially, a section of directories is selected by a user as indicated by block 202. Such selection causes a listing of directories of a particular type to be displayed. Thereafter, a user pages through the selected section in order to locate a desired directory,. This is indicated by block 206. A user may continue to select different section and page through the different sections until a desired directory is selected. The selection of a directory is indicated by block 204.

Upon selection of a directory, a preferred embodiment displays the resources associated with selected directory. This is indicated by block 210. The selected tab will display a listing of resources which are associated with the tab. After a tab is selected, a user pages through the displayed resources as indicated by block 208. A user may continue to select resource tabs and page through the associated resources until a desired resource is selected. A test is performed at decision block 211 to determine if the resource has been located. If not, then control passes back to function block 202 for additional processing as described above. If the resource has been located, then a user selects a tab associated with the displayed resources as indicated by block 214.

Once a resource is finally selected it may be employed to implement a desired task as indicated by block 216. The resource, in the form of an object, is employed in conjunction with other objects within the object oriented operating system in order to implement the task.

Resources are separated into two essential types. The first type of resource involves resources that are utilized infrequently. Such resources are preferably maintained and accessed from directly within the resource book. The resource is also then implemented from within the resource book. For instance, a user can drag and drop a document within a resource to effectuate a printing of the document. As a further example, a user can drag a business card resource from the resource book and drop it within a document to cause a collaboration between the user and the person represented by the business card.

The second type of resource are those resources which the user accesses frequently or expects to use often. In contrast to the first type of resource, the second type of resource can be maintained in three manners: (i) the resource can be conspicuously displayed within the resource book; (ii) the resource can be stored within a local section of directories within the resource book; or, (iii) the resource can be dragged from the resource book and onto the desktop of the user to create a persistent reference of the resource. Each manner of storage allows for the resource to be immediately accessed by a user.

In order to facilitate the browsing process of a user, the resource book provides for the filtering of resources. In other words, a user is permitted to isolate a particular type of resource. For instance, a user who is interested in printers can limit the display of the interface to all resources which are printers. Furthermore, the interface is permitted to view multiple namespaces simultaneously.

Furthermore, icons representing a resource can be utilized to differentiate resources of a common type. For instance, a section may contain a listing of the same type of resources such as printers which are further divisible into multiple different types of printers. Accordingly, simple LaserWriters, grayscale LaserWriters, color laser printers and 600 dpi printers, are each denoted by a distinct icon to aid a user in selecting a resource.

Each resource that is featured within the resource book contains information regarding a substantial number of attributes of the resource. The resource book displays the fundamental attributes of namespace, name, and type of attribute for each resource. The user has the ability, however, to view the full set of attributes for a resource by "opening" a resource. Opening a resource presents a view of all of the attributes of the resource as well as additional information. An opened view may be presented in a different manners for each type of resource. Thus, an opened view for a printer resource may be presented differently then the opened view for a person resource.

A preferred embodiment provides an interface having simple and consistent attributes. As such, a user is not intimidated from applying the resource book to specific tasks. Rather, the interface of the resource book contains features that are indicative of an actual telephone directory. Thus, a preferred embodiment presents a user with an interface that is readily identifiable and manageable.

A preferred embodiment, referred to as a resource book, presents an interface which displays the diverse set of resources available to a user. The resources available to the user include file documents, persons, print services, connection information, databases, electronic mail, scheduling, financial services, and collaboration.

The set of supported resource information extensible beyond information located in a physical name service. Accordingly, the resource book should include resources of maps, useful listings such as zip codes, listings of frequently used telephone numbers, emergency telephone numbers, company forms and other similar information. Hence, diverse sources of information are integrated into the object oriented operating environment of the user through a preferred embodiment.

Similar to a telephone directory, the resource book is divided by sections and tabs to organize the directories and resources, respectively. It is important that the directories and resources be divided by sections and tabs because of the broad set of information stored within the resource book. The sections and tabs of the resource book thus enable a user to efficiently browse through a large set of available resources.

Preferably, the display interface of present invention presents directories and resources within an outline format. This provides for an interface that is free of complexity. It also provides a user with the ability of making a single selection to view one or more directories.

Figure 3:
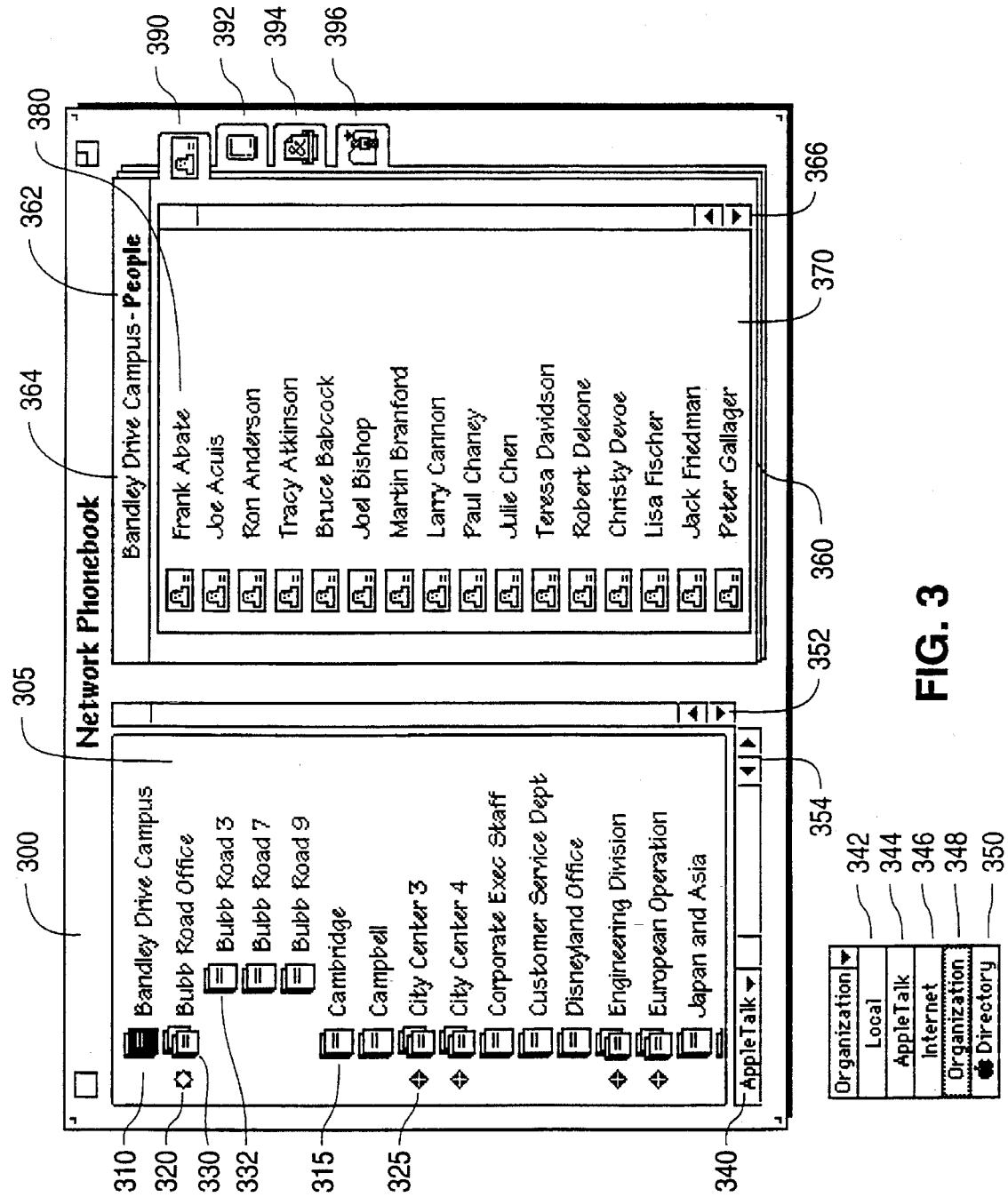
FIG. 3 illustrates a resource book upon a display interface in accordance with a preferred embodiment.

Referring to FIG. 3, a resource book is illustrated in accordance with a preferred embodiment. Reference numeral 300 depicts the complete network phonebook browser. It consists of two primary sections appearing at 305 and 360. Section 305 depicts a collection of phonebooks available to the user and section 360 depicts a collection of local and network resources associated with the phonebook selected in section 305. The information appearing at 305 depicts a collection of phonebooks, each of which has a collection of network and local resources associated with it. The collection of phonebooks in this view is not fixed and this section can be scrolled using scrollbar 352, 354 to access additional phonebooks. Each phonebook is represented by an icon which facilities operations such as selection and drag operations.

Reference numeral 340 labels a pop-up control which facilitates selection of a set of phonebooks which are to be displayed in section 305. The selections for this control include options for the available set of network directory services as well as a custom collection of preferred phonebooks. The current selection for the control 340 in FIG. 3 is the AppleTalk directory service collection of phonebooks. This option allows new types of directory services to be added to the existing types while maintaining consistency and facilitating access to these resources. The pop-up appears as shown at 342, 344, 346, 348 and 350. The current network selection AppleTalk 340 corresponds to the entry in the pop-up menu at 344.

The icon depicted at 310 is shown in a selected state. This state indicates that the phonebook is the currently selected phonebook, and this selection is used to determine which phonebook is represented in section 360, 362, and 370 which change to reflect the selection in section 305. Item 315 is shown in its non-selected state. Because it is not selected, it has no effect on the sections 360, 362, and 370. It is, however, a choice available for selection in section 305. Reference numeral 320 depicts an outline control which expands or collapses a representation of phonebook 330. When the control is shown in its open state, as in numeral 320, any phonebooks which are logical children of the corresponding phonebook are then added to the collection and displayed, as are the phonebooks shown at item 332. 325 labels the outline control in a "closed" state, where child phonebooks are not shown. Reference 370 labels a scrollable collection of network or local resources which are available for selection, copying, or direct manipulation operations.

Numeral 380 labels an example of a business card icon associated with a collection of resources for the selected phonebook entitled Bandley Drive Campus 364 of type "People" 362. Scroll bar 366 controls scrolling operations for the phonebook. Various tabs 390, 392, 394 and 396 are located at the side of the phonebook for controlling the types of resources displayed in the phonebook section 370 of the window. Tab 390 is a graphical representation associated with business cards. Selection of the business card tab 390 presents a list of business cards associated with the selected phonebook and updates the type to display "business cards" 362. Tab 392 is a graphical representation associated with machines on the network. Selection of the business card tab 392 presents a list of networked machines associated with the selected phonebook and updates the type to display "machines" 362. Tab 394 is a graphical representation associated with business cards. Selection of the printers tab 394 presents a list of printers associated with the selected phonebook and updates the type to display "printers" 362. Tab 396 is a graphical representation associated with shared folders. Selection of the shared folders tab 390 presents a list of shared folders associated with the selected phonebook and updates the type to display "shared folders" 362. Other tabs are not shown but are supported for Places, databases, documents and distributed services.

Multiple directories may be displayed at one time. Such a display feature is especially useful in moving resources such as persons from one directory to another. This allows network administrators to readily update one or more directories when there is a change in a resource such as when a person changes location.

Different sections of network directories may be simultaneously viewed, and similarly the contents of different tabs may also be simultaneously viewed. Thus, a user could view multiple resource types of a given directory. This is accomplished by shift-clicking on a second tab containing the type of resource that is desired to be viewed. This feature is especially helpful when searching for available resources without the goal of finding a specific resource.

Sections of Directories

A preferred embodiment allows for directories to be separated within different sections. These sections can include the following: (i) personal directories; (ii) local directories; and, (iii) external directories.

Resources are typically organized within a namespace by physical subnetwork, distribution, and replication boundaries. Since this organization is typically different from the actual working set of resources that a user utilizes, a preferred embodiment permits individual users to organize selected directories within what is referred to as a personal or local section.

In addition to personal directories, a preferred embodiment provides for a local section. Due to the immense number of directories, the task of finding an appropriate directory can be cumbersome. For instance, the X.500 name service is designed to present a distributed set of naming information which can be used for all companies, universities, and governments throughout the world. Still further, other services such as the Domain Name Service ("DNS") and the Internet name service support a large number of sites located throughout the world.

To solve this problem, a preferred embodiment is integrated within the global scale of large networks by limiting the view of the user to an immediate vicinity. This is accomplished by determining and displaying only those directories which a user is most likely to use. For instance, the directories which refer to the actual network of a user or nearby networks are determined to be local. Furthermore, in a large organizational structure such as the X.500 name service, some subset of the name service hierarchy in the name service hierarchy is designated as the boundary of a local directory. Accordingly, any namespaces within that hierarchy contains resources that are represented as a directory within a local section. A user can insert a directory within a local section by dragging and dropping the directory within the local section or onto a designated area.

While the distinct concepts of both personal and local sections are useful, both categories of directories may be retained within the same section. This is done to preclude duplication. Thus, the label of "Local" can be applied to a section containing both local and personal directories. When combined, the section contains the set of directories most often used or likely to be used.

Although resources contained within the directories of a local section are frequently utilized, a user may view a resource that is not accessible through a local section. To satisfy this requirement, an external section of directories is formed to contain the resources which are not designated to be within the local directory but are within the actual network of a user. In other words, the external section of directories includes namespaces, other than namespaces that are designated as local, which exist within the name service of the actual network of a user.

A preferred embodiment provides a number of features within the resource book. Such features include a table of contents, tabular markers, section placement, bookmarks, a resource, and methods of synchronizing resources within an actual network. A table of contents can be formed with respect to the resource book. The table of contents provides an outline view of the organization of directories and resources within the resource book.

To assist a user in locating a desired resource, a preferred embodiment provides two methods for allocating a resource. First, a location mechanism provides a user with the ability to form queries upon multiple namespaces to locate a resource. Second, a keyboard typeahead mechanism can be employed to allow a user to enter characters of the name of a desired resource within a particular namespace. In response to the entered characters, the keyboard typeahead mechanism presents a scrollable list of matching resources. Thus, the location mechanism is utilized for searches involving multiple namespaces whereas the keyboard typeahead mechanism is utilized when searching a single namespace. Furthermore, a preferred embodiment may also provide a feature which records and maintains a listing of frequently used resources.

The location mechanism allows a user to select the namespaces to searched. After the user has selected some set of directories, a "Find" command is entered to commence the search. Thereafter, other directories not initially selected could be dragged in to serve as additional sources. Further, a feature is provided wherein comparable resources are searched for upon a user selection of a resource. This is accomplished by denoting an area within the window of the location window wherein a user could drag some resource from the resource book. Accordingly, the location mechanism would search and locate those resources most closely related to the selected resource.

A preferred embodiment allows for information within the resource book to be synchronized, that is updated upon a change of information, by four methods. First, a user may be given manual control over updated information and provide a refresh operation. Second, a heuristic algorithm can be employed to perform synchronization. Third, the degree of synchronization can be dependent upon the amount of interface activity that the resource book is receiving from the user. Accordingly, user activity with respect to a particular directory calls for synchronization to be undertaken upon that directory. Conversely, a directory that has not been activated is not synchronized since the user is likely not to be interested in the information contained within the inactivated directory. The fourth method is to initially obtain a reasonably complete set of information, and subsequently detect likely additions.

Figure 4:
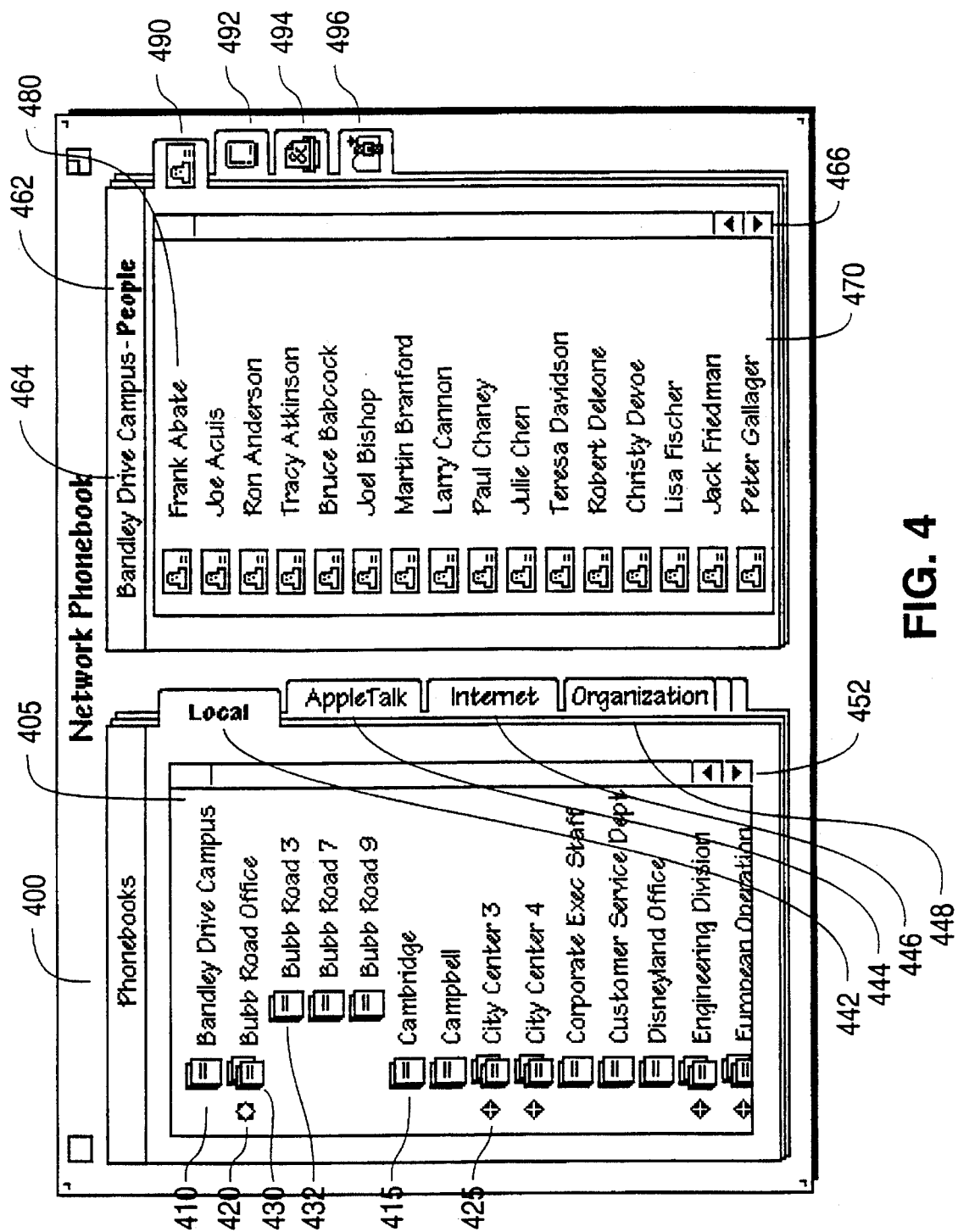
FIG. 4 illustrates a resource book with tabs on the selection of the class of phonebooks in accordance with a preferred embodiment.

FIG. 4 illustrates a resource book with tabs on the selection of the class of phonebooks in accordance with a preferred embodiment. Referring to FIG. 4, a resource book is illustrated in accordance with a preferred embodiment. Reference numeral 400 depicts the complete network phonebook browser. It consists of two primary sections appearing at 405 and 460. Section 405 depicts a collection of phonebooks available to the user and section 460 depicts a collection of local and network resources associated with the phonebook selected in section 405. The information appearing at 405 depicts a collection of phonebooks, each of which has a collection of network and local resources associated with it. The collection of phonebooks in this view is not fixed and this section can be scrolled using scrollbar 452 to access additional phonebooks. Each phonebook is represented by an icon which facilities operations such as selection and drag operations.

Reference numeral 442, 444, 448 and 446 labels tab controls which facilitate selection of a set of phonebooks which are to be displayed in section 405. The selections for this control include options for the available set of network directory services as well as a custom collection of preferred phonebooks. The current selection in FIG. 4 is the AppleTalk directory service collection of phonebooks. This option allows new types of directory services to be added to the existing types while maintaining consistency and facilitating access to these resources.

The icon depicted at 410 is shown in a selected state. This state indicates that the phonebook is the currently selected phonebook, and this selection is used to determine which phonebook is represented in section 460, 462, and 470 which change to reflect the selection in section 405. Item 415 is shown in its non-selected state. Because it is not selected, it has no effect on the sections 460, 462, and 470. It is, however, a choice available for selection in section 405. Reference numeral 420 depicts an outline control which expands or collapses a representation of phonebook 430. When the control is shown in its open state, as in numeral 420, any phonebooks which are logical children of the corresponding phonebook are then added to the collection and displayed, as are the phonebooks shown at item 432. 425 labels the outline control in a "closed" state, where child phonebooks are not shown. Reference 470 labels a scrollable collection of network or local resources which are available for selection, copying, or direct manipulation operations.

Numeral 480 labels an example of a business card icon associated with a collection of resources for the selected phonebook entitled Bandley Drive Campus 464 of type "People" 462. Scroll bar 466 controls scrolling operations for the phonebook. Various tabs 490, 492, 494 and 496 are located at the side of the phonebook for controlling the types of resources displayed in the phonebook section 470 of the window. Tab 490 is a graphical representation associated with business cards. Selection of the business card tab 490 presents a list of business cards associated with the selected phonebook and updates the type to display "business cards" 462. Tab 492 is a graphical representation associated with machines on the network. Selection of the business card tab 492 presents a list of networked machines associated with the selected phonebook and updates the type to display "machines" 462. Tab 494 is a graphical representation associated with business cards. Selection of the printers tab 494 presents a list of printers associated with the selected phonebook and updates the type to display "printers" 462. Tab 496 is a graphical representation associated with shared folders. Selection of the shared folders tab 490 presents a list of shared folders associated with the selected phonebook and updates the type to display "shared folders" 462. Other tabs are not shown but are supported for Places, databases, documents and distributed services.

Figure 5:
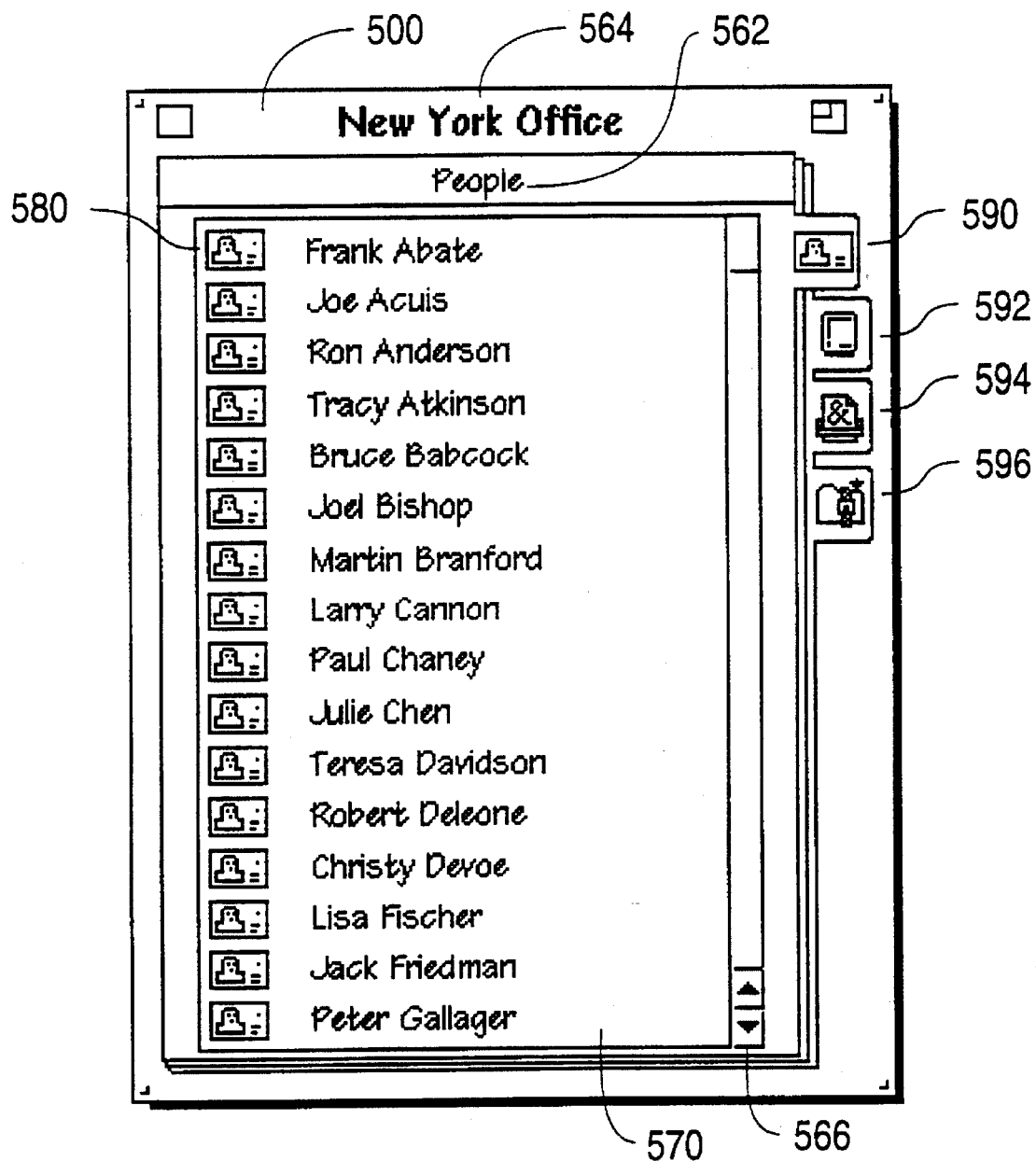
FIG. 5 illustrates a single phonebook employing scrolling in accordance with a preferred embodiment.

FIG. 5 illustrates a single phonebook employing scrolling in accordance with a preferred embodiment. Referring to FIG. 5, a resource book is illustrated in accordance with a preferred embodiment. Reference numeral 500 depicts the complete network phonebook browser. Reference 570 labels a scrollable collection of network or local resources which are available for selection, copying, or direct manipulation operations. Numeral 580 labels an example of a business card icon associated with a collection of resources for the selected phonebook entitled New York Office 564 of type "People" 562. Scroll bar 566 controls scrolling operations for the phonebook. Various tabs 590, 592, 594 and 596 are located at the side of the phonebook for controlling the types of resources displayed in the phonebook section 570 of the window. Tab 590 is a graphical representation associated with business cards. Selection of the business card tab 590 presents a list of business cards associated with the selected phonebook and updates the type to display "business cards" 562. Tab 592 is a graphical representation associated with machines on the network. Selection of the business card tab 592 presents a list of networked machines associated with the selected phonebook and updates the type to display "machines" 562. Tab 594 is a graphical representation associated with business cards. Selection of the printers tab 594 presents a list of printers associated with the selected phonebook and updates the type to display "printers" 562. Tab 596 is a graphical representation associated with shared folders. Selection of the shared folders tab 590 presents a list of shared folders associated with the selected phonebook and updates the type to display "shared folders" 562. Other tabs are not shown but are supported for Places, databases, documents and distributed services.

Figure 6:
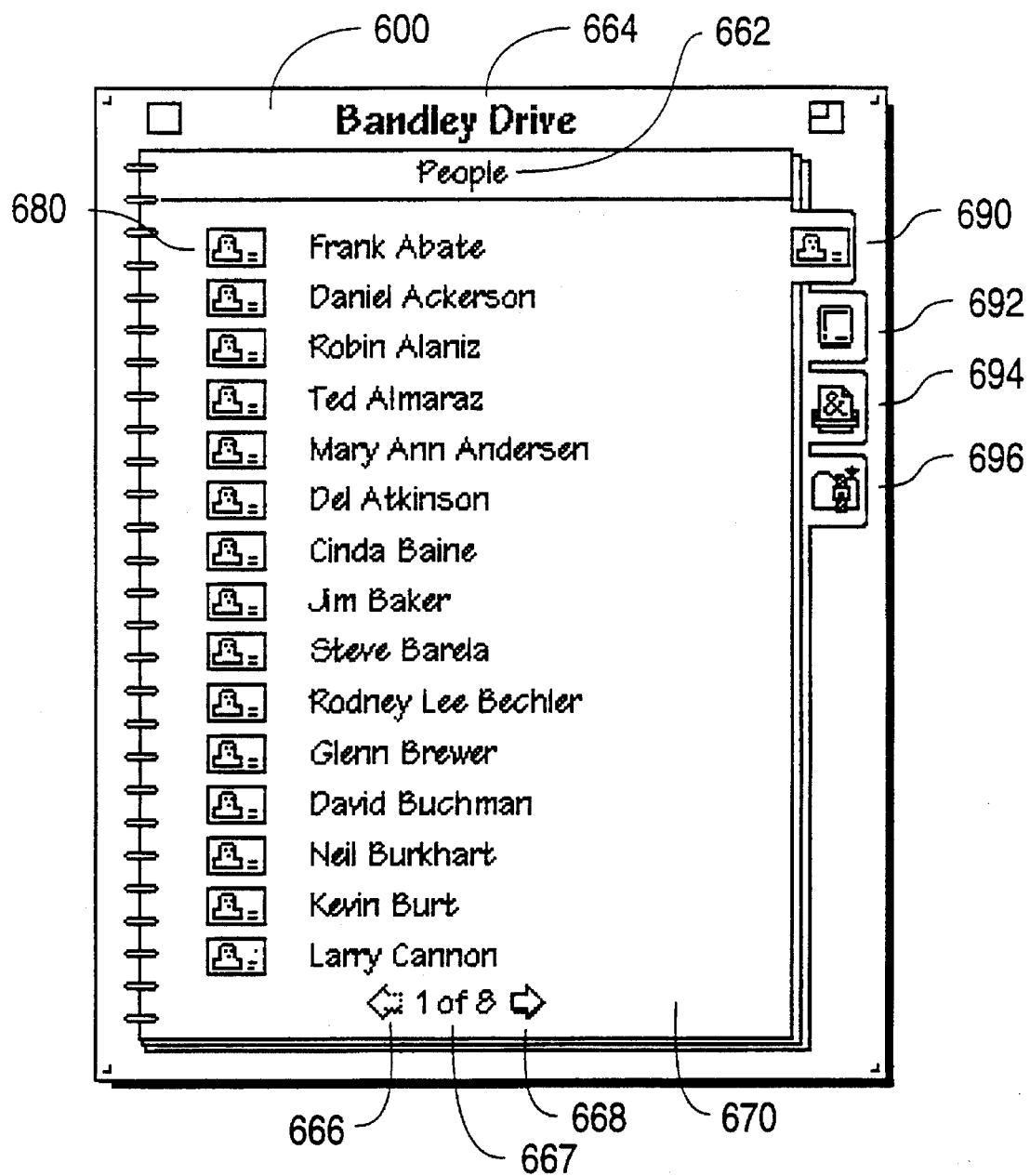
FIG. 6 illustrates a single phonebook using paging in accordance with a preferred embodiment.

FIG. 6 illustrates a single phonebook using paging in accordance with a preferred embodiment. Referring to FIG. 6, a resource book is illustrated in accordance with a preferred embodiment. Reference numeral 600 depicts the complete network phonebook browser. Reference 670 labels a paged collection of network or local resources which are available for selection, copying, or direct manipulation operations. Numeral 680 labels an example of a business card icon associated with a collection of resources for the selected phonebook entitled Bandley Drive Campus 664 of type "People" 662. Page Back Control 666 controls paging backwards through resources within the current tab for the phonebook. Page Forward Control 668 controls paging forwards through resources within the current tab for the phonebook. Label 667 points to a current page display for the current set of resources. Various tabs 690, 692, 694 and 696 are located at the side of the phonebook for controlling the types of resources displayed in the phonebook section 670 of the window. Tab 690 is a graphical representation associated with business cards. Selection of the business card tab 690 presents a list of business cards associated with the selected phonebook and updates the type to display "business cards" 662. Tab 692 is a graphical representation associated with machines on the network. Selection of the business card tab 692 presents a list of networked machines associated with the selected phonebook and updates the type to display "machines" 662. Tab 694 is a graphical representation associated with business cards. Selection of the printers tab 694 presents a list of printers associated with the selected phonebook and updates the type to display "printers" 662. Tab 696 is a graphical representation associated with shared folders. Selection of the shared folders tab 690 presents a list of shared folders associated with the selected phonebook and updates the type to display "shared folders" 662. Other tabs are not shown but are supported for Places, databases, documents and distributed services.

Figure 7:
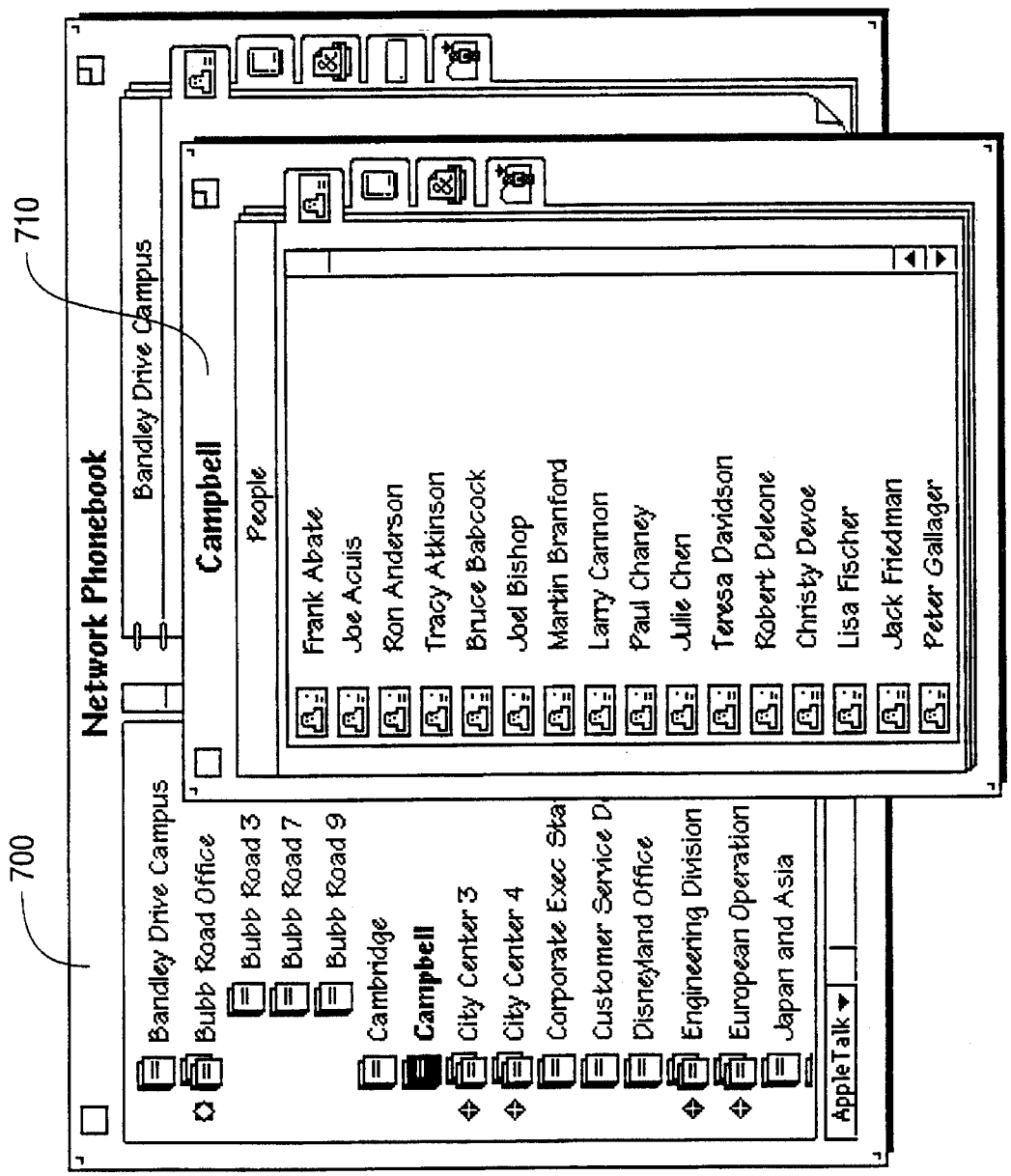
FIG. 7 illustrates the opening of a second directory from within a first directory in accordance with a preferred embodiment.

FIG. 7 illustrates the opening of a second directory from within a first directory in accordance with a preferred embodiment. In window 700 the Campbell phonebook has been selected and opened into window 710 with the associated scrollable, single phonebook as detailed in FIG. 5.

Figure 8:
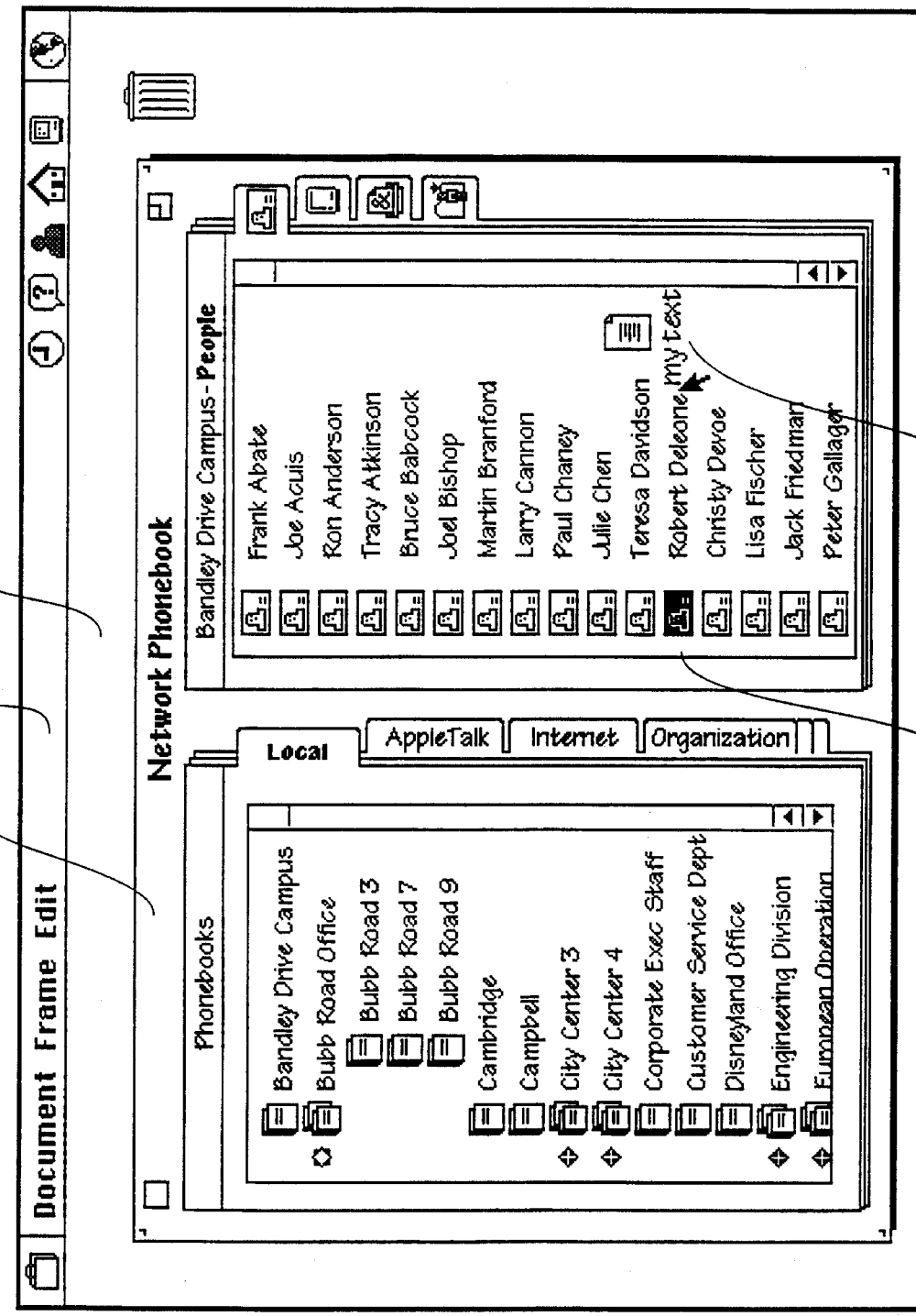
FIG. 8 illustrates a direct manipulation operation from the workspace environment to a resource within a phonebook.

FIG. 8 illustrates a direct manipulation operation from the workspace environment to a resource within a phonebook. The phonebook 800 is open within desktop environment 820. Then pull down menu is presented at 810 for the phonebook 800. Document 840 has been dragged using cursor manipulation tools known in the art to a resource 830 within an open phonebook. In the example, dragging a document to a business card could invoke a mail function to transmit the document to the person's computer.

Figure 9:
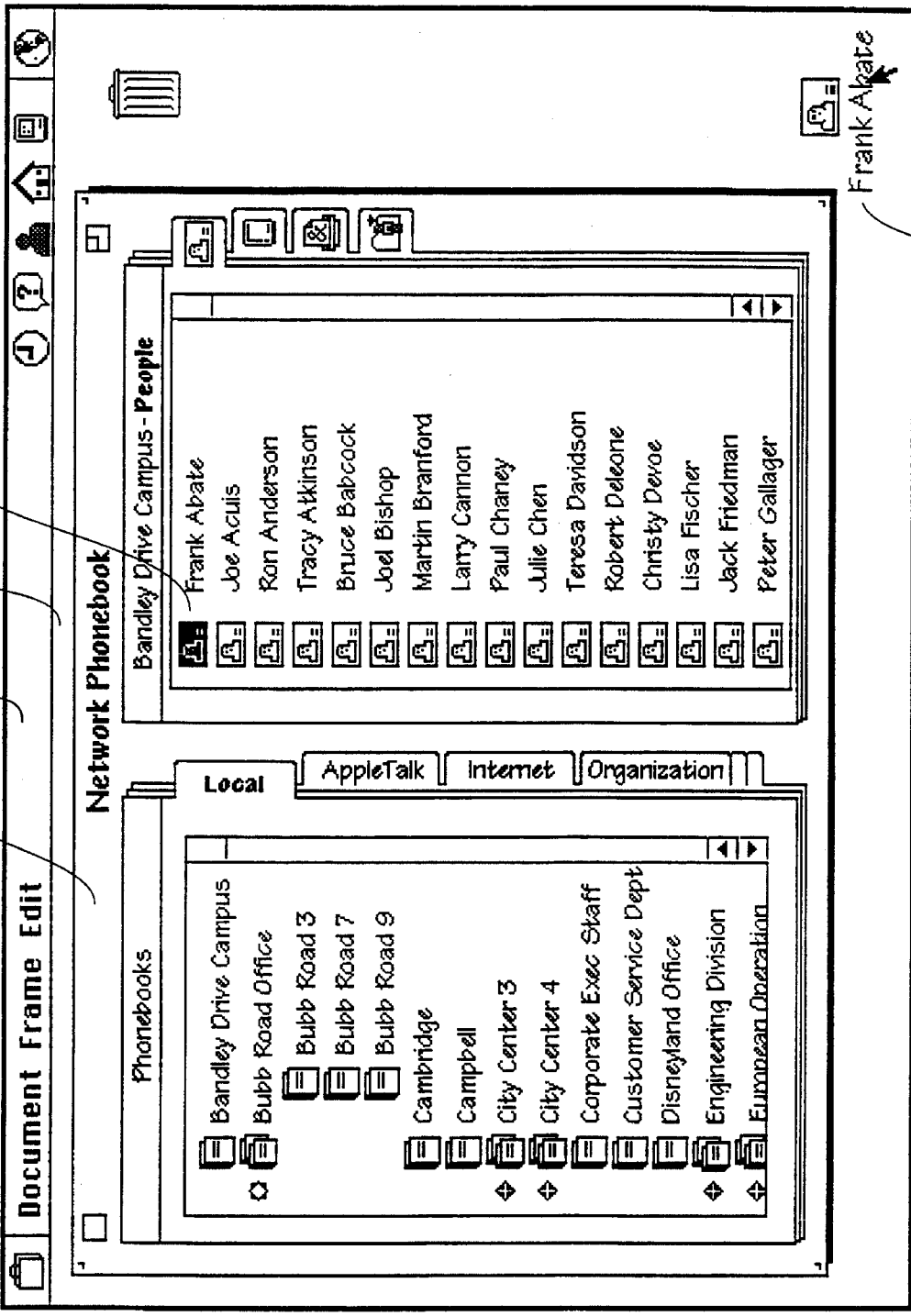
FIG. 9 illustrates a direct manipulation of a resource from the phonebook to a workspace environment.

FIG. 9 illustrates a direct manipulation of a resource from the phonebook to a workspace environment. The phonebook 900 is open within desktop environment 920. Then pull down menu is presented at 910 for the phonebook 900. Resource 930 has been dragged to the workspace 920 and has left a copy or link of the resource on the desktop.

Figure 10:
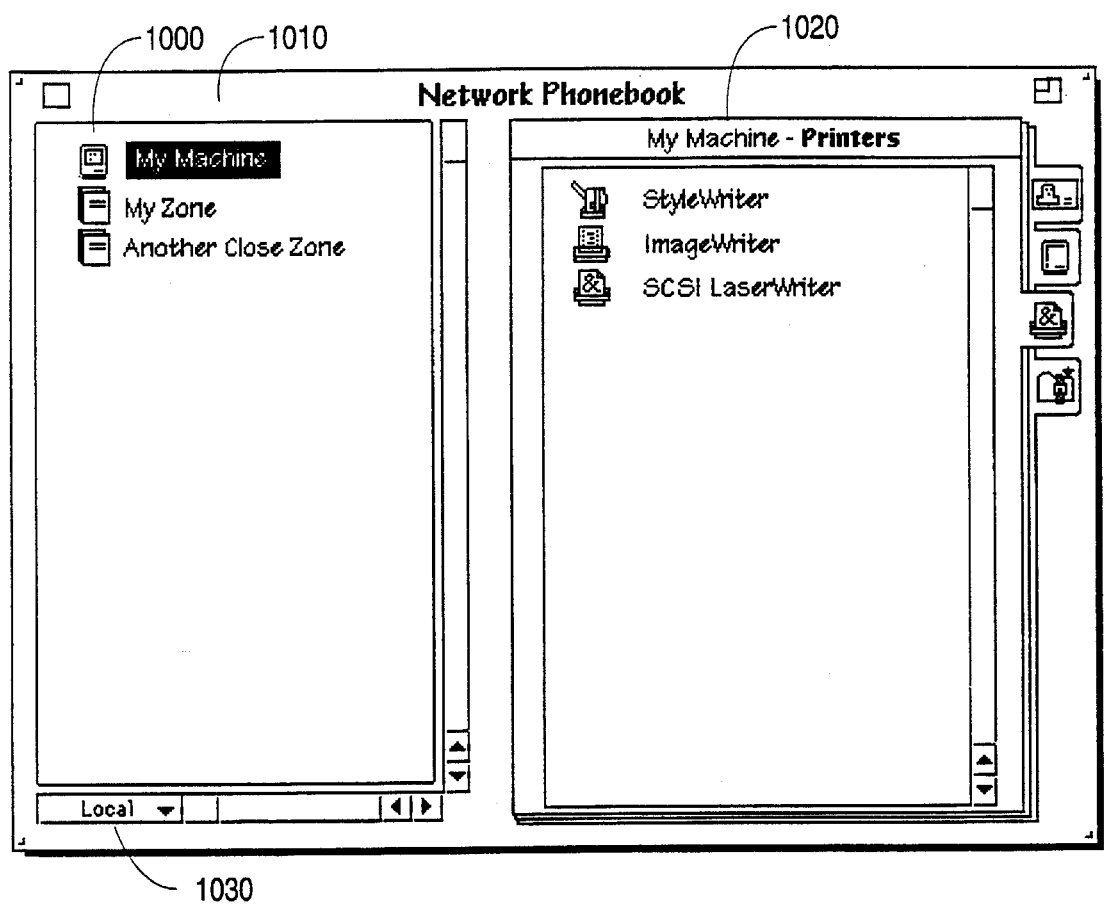
FIG. 10 illustrates a local computer resource display in accordance with a preferred embodiment.

FIG. 10 illustrates a local computer resource display in accordance with a preferred embodiment. Label 1000 is attached to a graphical representation of a local computer. The Network Phonebook 1010 shows the local set of directories utilizing popup control 1030. Label 1020 indicates that the local machine resource 1000 has been selected, and all resources associated with the local machine 1000 are presented in the resource area directly under 1020.

While the invention has been described in terms of a preferred embodiment in a specific system environment, those skilled in the art recognize that the invention can be practiced, with modification, in other and different hardware and software environments within the spirit and scope of the appended claims.

Having thus described our invention, what we claim as new, and desire to secure by Letters Patent is:

1. A system for selecting one of a plurality of computer resources, each of the plurality of computer resources having one of a plurality of attribute types, the system being operable with computer apparatus having a workstation including a display and a computer network connecting the plurality of computer resources and the workstation, the system comprising:

(a) first means for displaying a first window and a second window on the display;

(b) second means for displaying a plurality of resource book graphics in the first window, each of the plurality of resource book graphics representative of one of a plurality of resource books, each of the plurality of resource books having an attribute name and an attribute type of at least one of the plurality of computer resources;

(c) third means for selecting one of the plurality of resource books by selecting the corresponding resource book graphic displayed in the first window;

(d) fourth means for displaying a plurality of resource graphics in the second window, each of the plurality of resource graphics being associated with the selected resource book and representative of a computer resource, each computer resource having the same attribute type; and (e) fifth means for displaying a plurality of tab icons in the second window, each of the plurality of tab icons being representative of one of the plurality of attribute types of the computer resources and corresponding to one of a plurality of resource pages.

2. The system as recited in claim 1, wherein at least one of the plurality of tab icons displayed in the second window by the fifth means identifies a plurality of resource graphics representative of computer resources connected to the workstation by the computer network.

3. The system as recited in claim 1, wherein at least one of the plurality of tab icons displayed in the second window by the fifth means identifies a plurality of resource graphics representative of computer resources connected directly to the workstation.

4. The system as recited in claim 1, wherein the plurality of computer resources include people resources, place resources and thing resources.

5. The system as recited in claim 1, wherein the plurality of computer resources include data bases, document files, communication information, and distribution services.

6. The system as recited in claim 1, wherein the fifth means is responsive to a selection of a first one of the plurality of tab icons for selecting one of the plurality of resource graphics and in response to such selection displays in the second window a list of printers.

7. The system as recited in claim 1, wherein the fifth means is responsive to a selection of a second one of the plurality of tab icons for selecting one of the plurality of resource graphics and in response to such selection displays in the second window a list of machines coupled to the computer network.

8. The system as recited in claim 1, including means for displaying a database type graphic on one of the plurality of tab icons.

9. The system as recited in claim 1, including means for displaying a machine type graphic on one of the plurality of tab icons.

10. The system as recited in claim 1, including means for displaying a shared folder type graphic on one of the plurality of tab icons.

11. The system as recited in claim 1, including means for displaying a places type graphic on one of the plurality of tab icons.

12. The system as recited in claim 1, including means for displaying a document type graphic on one of the plurality of tab icons.

13. The system as recited in claim 1, including means for displaying a distributed services type graphic on one of the plurality of tab icons.

14. The system as recited in claim 1, including means for displaying a miscellaneous type graphic on one of the plurality of tab icons.

15. The system as recited in claim 1, including means for selecting a tab icon associated with a particular attribute type and displaying, in the second window, one graphic for each computer resource having the particular attribute type.

16. The system as recited in claim 1, including means for displaying in the first window a graphic representative of a title indicative of an attribute type of a computer resource contained in the selected resource book.

17. The system as recited in claim 1, wherein the resource book is displayed in the first window as a resource book icon.

18. The system as recited in claim 17, wherein the resource book icon represents a plurality of resource books.

19. The system as recited in claim 1, wherein each computer resource is represented in at least one of the plurality of resource books as an icon.

\* \* \* \* \*